United States Patent
Yoon

(10) Patent No.: US 9,955,457 B2
(45) Date of Patent: Apr. 24, 2018

(54) TERMINAL FOR USER, DRIVING METHOD THEREOF, AND COMPUTER READABLE RECORDING MEDIUM

(71) Applicant: SAMSUNG ELECTRONICS CO., LTD., Suwon-si, Gyeonggi-do (KR)

(72) Inventor: Suk-un Yoon, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 451 days.

(21) Appl. No.: 14/520,475

(22) Filed: Oct. 22, 2014

(65) Prior Publication Data
US 2015/0257129 A1 Sep. 10, 2015

(30) Foreign Application Priority Data
Mar. 5, 2014 (KR) .................. 10-2014-0025983

(51) Int. Cl.
*H04W 72/02* (2009.01)
*H04W 4/00* (2018.01)
(Continued)

(52) U.S. Cl.
CPC .......... *H04W 72/02* (2013.01); *H04W 4/008* (2013.01); *H04W 72/005* (2013.01);
(Continued)

(58) Field of Classification Search
CPC ... H04W 4/008; H04W 76/023; H04W 84/12; H04W 84/18; H04W 88/06; H04W 72/005; H04W 72/02; H04W 92/18; H04W 8/005
See application file for complete search history.

(56) References Cited

U.S. PATENT DOCUMENTS 8,363,597 B2   1/2013 Abraham et al.
9,609,676 B1 *  3/2017 Bijwe .................. H04W 8/005
(Continued)

FOREIGN PATENT DOCUMENTS

JP      2012-523770      10/2012
JP       2013-42400       2/2013
(Continued)

OTHER PUBLICATIONS

Extended European Search Report dated Jul. 8, 2015 in corresponding European Patent Application No. 15155013.4.
(Continued)

*Primary Examiner* — Oussama Roudani
(74) *Attorney, Agent, or Firm* — Staas & Halsey LLP

(57) ABSTRACT

A user terminal apparatus, a driving method of the user terminal apparatus and a computer readable recording medium thereof are provided, in which the user terminal apparatus is configured to perform communication with a first external device and a second external device and includes a first communication interface performing communication with the first external device, a second communication interface performing communication with the second external device, and a controller determining characteristics of the received signals when signals of the second external device are received at currently operating channel which performs communication with the first external device through the first communication interface while performing communication with the first external device, and controlling the second communication interface to perform communication with the second external device according to a determining result.

18 Claims, 8 Drawing Sheets

(51) Int. Cl.
*H04W 76/02* (2009.01)
*H04W 92/18* (2009.01)
*H04W 72/00* (2009.01)
H04W 8/00 (2009.01)
H04W 84/12 (2009.01)
H04W 88/06 (2009.01)

(52) U.S. Cl.
CPC ......... *H04W 76/023* (2013.01); *H04W 92/18* (2013.01); *H04W 8/005* (2013.01); *H04W 84/12* (2013.01); *H04W 88/06* (2013.01)

(56) References Cited

U.S. PATENT DOCUMENTS

| 2010/0157835 A1* | 6/2010 | Zhang | H04W 36/30 370/252 |
|---|---|---|---|
| 2011/0305227 A1 | 12/2011 | Heerboth | |
| 2012/0134349 A1 | 5/2012 | Jung et al. | |
| 2013/0044635 A1 | 2/2013 | Suzuki | |
| 2013/0065627 A1 | 3/2013 | Jung et al. | |
| 2013/0232253 A1 | 9/2013 | Elhaddad et al. | |
| 2014/0075523 A1* | 3/2014 | Tuomaala | H04L 63/083 726/6 |

FOREIGN PATENT DOCUMENTS

| KR | 10-2012-0056533 | 6/2012 |
| KR | 10-2012-0124318 | 11/2012 |

OTHER PUBLICATIONS

European Patent Office Communication dated Feb. 7, 2018 in European Patent Application No. 15155013.4.

\* cited by examiner

TERMINAL FOR USER, DRIVING METHOD THEREOF, AND COMPUTER READABLE RECORDING MEDIUM

CROSS-REFERENCE TO RELATED APPLICATIONS

This application claims priority from Korean Patent Application No. 10-2014-0025983, filed on Mar. 5, 2014 in the Korean Intellectual Property Office, the disclosure of which is incorporated herein by reference in its entirety.

BACKGROUND

1. Field

Devices, methods and media consistent with what is disclosed herein relate to a user terminal, a driving method thereof, and a computer readable recording medium, and more specifically, to a user terminal apparatus configured to quickly process a request searching P2P (peer to peer) while receiving broadcasting signals through an internet from mobile phones and DTV (Digital TV), a driving method of the user terminal apparatus, and a computer readable recording medium thereof.

2. Description of the Related Art

Wi-Fi P2P technology suggested by the Wi-Fi alliance provides compatibility with the related Wi-Fi and simultaneously provides functions that can perform communication by directly connecting devices providing Wi-Fi functions without access points (AP). Direct communication functions between devices have similarity to functions provided in Bluetooth technology; however, because Wi-Fi P2P functions have a better advantages in view of transmission range and data transmission speed compared to Bluetooth, Wi-Fi P2P functions are quickly substituted for Bluetooth functions. For example, while Bluetooth 4.0, which is the latest Bluetooth standard, supports a transmission range of a maximum 100 m and a transmission speed of a maximum 24 Mbps, Wi-Fi direct communication supports a transmission range of a maximum 200 m and a transmission speed of a maximum 300 Mbps.

Normally, Wi-Fi devices support data communication through wireless connecting with an AP. In order to support the connecting between Wi-Fi devices without an AP, the standard regarding Wi-Fi P2P connecting is published, which is applied in the related products. Wi-Fi P2P standard supports the connecting by 1:1 or 1:N, and supports functions simultaneously supporting normal Wi-Fi and Wi-Fi P2P. Functions of Wi-Fi P2P use packets of a probe request and a probe response in order to find Wi-Fi P2P devices to be connected. In response to a request from a device to be connected, a Wi-Fi P2P device uses a listening state for confirming whether a request is generated from an established specific channel.

However, when functions simultaneously supporting normal Wi-Fi and Wi-Fi P2P, which are described in the standard, are applied in TVs or smart phones, performance may deteriorate in normal the Wi-Fi. The deterioration may happen because physical resources are commonly shared and used. The performance deterioration in the normal Wi-Fi happens uniformly in the listening state in which a small amount of data are transmitted and received. For example, when the Wi-Fi listening state is established in order to respond to a request of surrounding Wi-Fi P2P devices simultaneously while receiving data from a Wi-Fi terminal through streaming services, i.e., when the background operations are performed, two services perform or operate simultaneously and wireless resource is time-shared. Thus, the related Wi-Fi performance may deteriorate.

SUMMARY

Exemplary embodiments overcome the above disadvantages and other disadvantages not described above. Also, the embodiments are not required to overcome the disadvantages described above, and an exemplary embodiment may not overcome any of the problems described above.

According to an embodiment, a technical goal is to provide a user terminal apparatus configured to quickly process P2P searching requests simultaneously while receiving broadcasting signals through the internet from mobile phones and DTV, a driving method of the user terminal apparatus, and computer readable recording medium thereof.

According to an embodiment, the user terminal apparatus configured to perform communication with a first external device and a second external device may include a first communication interface configured to perform communication with the first external device, a second communication interface configured to perform communication with the second external device, and a controller configured to determine characteristics of the received signals and control the second communication interface to perform communication with the second external device according to a determining result when signals of the second external device are received at currently operating channel which performs communication with the first external device through the first communication interface while performing communication with the first external device.

The first communication interface may perform wireless LAN communication, and the second communication interface may perform direct (P2P) communication.

The controller may generate and provide event signals including address information of the second external device included in the received signals to the second communication interface, and the second communication interface may perform communication with the second external device based on the address information of the event signals.

The user terminal apparatus may further include an event signal processor configured to determine whether the received signals are request signals (Probe Request) for the P2P communication, and generate event signals comprising address information of the second external device included in the signals when the received signals are request signals as a determining result, and the controller may provide the generated event signals to the second communication interface.

The controller may additionally include a switching unit configured to select communication paths of the first communication interface and the second communication interface.

The first communication interface may bypass the received signals to the controller when the received signals from the second external device are signals at currently operating channel which performs communication with the first external device, and discard the received signals when the signals are signals at different channel from currently operating channel.

The controller may determine types of the received signals in order to determine characteristics of the signals, and additionally determine whether the broadcasting signals are request signals for P2P communication when the signals are broadcasting signals as a determining result.

According to an embodiment, a driving method of a user terminal apparatus configured to perform communication with a first external device and a second external device may include performing communication with the first external device through a first communication interface, determining characteristics of the received signals when signals of the second external device are received at currently operating channel which performs communication with the first external device through the first communication interface while performing communication with the first external device, and performing communication with the second external device through a second communication interface according to a determining result.

The first communication interface may perform wireless LAN communication, and the second communication interface may perform direct (P2P) communication.

The wireless LAN communication and the direct communication may be Wi-Fi communications.

The performing communication with the second external device may include generating event signals regarding address information of the second external device included in the received signals when the signals are request signals for P2P communication as a determining result, and performing communication with the second external device based on the address information of the generated event signals by the second communication interface.

The determining characteristics of the received signals may include filtering the received signals at currently operating channel which performs communication with the first external device.

The determining characteristics of the received signals may include discarding signals of the second external device which are not received at currently operating channel.

The determining characteristics of the received signals may include determining types of the received signals, and determining whether the broadcasting signals are request signals for P2P communication when the received signals are broadcasting signals as a determining result.

According to an embodiment, in the computer readable recording medium configured to implement the driving method of the user terminal apparatus, the driving method of the user terminal apparatus implements performing communication with a first external device through a communication interface, determining characteristics of the received signals when signals of a second external device are received at currently operating channel which performs communication with the first external device through the communication interface while performing communication with the first external device, and performing communication with the second external device according to a determining result.

The determining characteristics of the received signals may include determining types of the received signals, and determining whether the broadcasting signals are request signals for P2P communication when the received signals are broadcasting signals as a determining result.

The determining characteristics of the received signals may include filtering signals of the second external device received at currently operating channel which performs communication with the first external device, and discarding signals of the second external device which are not received at currently operating channel.

Communication between the user terminal apparatus and the first external device may be Wi-Fi communication, and communication between the user terminal apparatus and the second external device may be Wi-Fi direct communication.

According to an embodiment, a method provided including determining a type of signal on a currently operating channel and communicating via the operating channel with P2P requests only when the type of signal is a P2P request signal, where the operating channel is not a shared until P2P requests have all been handled.

BRIEF DESCRIPTION OF THE DRAWINGS

The above and/or other aspects of the embodiments will be more apparent by describing certain exemplary embodiments with reference to the accompanying drawings, in which.

DETAILED DESCRIPTION OF EXEMPLARY EMBODIMENTS

Figure 1:
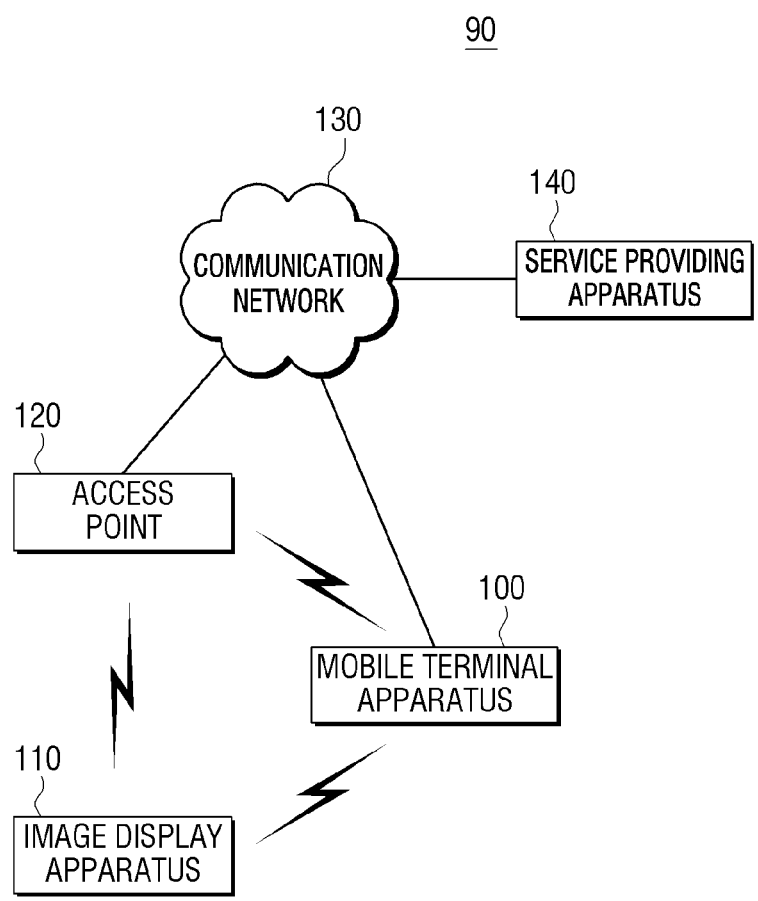
FIG. 1 illustrates a signal processing system according to an embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the embodiments. Accordingly, it is apparent that the exemplary embodiments can be carried out without those specifically defined matters. Also, well-known functions or constructions are not described in detail since they would obscure the embodiments with unnecessary detail.

Referring to the attached drawings, the embodiments will be described in detail below.

Figure 2:
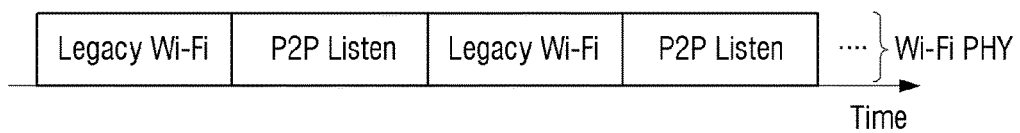
FIG. 2 illustrates an example of signals provided to a user terminal apparatus of FIG. 1.

FIG. 1 illustrates a signal processing system according to an embodiment, and FIG. 2 illustrates an example of signals provided to a user terminal apparatus of FIG. 1.

Referring to FIG. 1, the signal processing system 90 according to an embodiment includes a part or all of an image display apparatus 100, a mobile terminal apparatus 110, an access point (AP) 120, a communication network 130 and a service providing apparatus 140.

Herein, the image display apparatus 100 and the mobile terminal apparatus 110 indicate user terminal apparatuses, and "including a part or all" indicates that the system may be constituted by omitting some components, such as communication network 130 or service providing apparatus 140. For the purpose of easy understanding, an embodiment will be explained in which all of the above are included.

The image display apparatus 100 includes DTV and a desktop computer. The image display apparatus 100 may directly connect the communication network 130 in order to receive the services requested by a user from the service providing apparatus 140, and connect the communication network 130 through AP 120 which is recognized in surrounded areas. Thus, the image display apparatus 100 may receive image signals of various standards. Herein, various standards of image signals may indicate unicast signals and multicast signals.

Further, as illustrated in FIG. 2, the image display apparatus 100 receives image signals regarding the services requested by a user and simultaneously processes corresponding request signals (Probe Request) as broadcasting signals when the surrounded mobile terminal apparatus 110 requests P2P communication. Thereby, in response to broadcasting signals as received, the image display apparatus 100 may determine whether the signals are request signals according to P2P type communication. For the above, the image display apparatus 100 may determine types of the signals by confirming whether or not to synchronize the received signals or by confirming data within the packet. When the signals are determined to be request signals as a determining determined result, the image display apparatus 100 performs P2P communication with the mobile terminal apparatus 110 based on address information of the mobile terminal apparatus 110 included in corresponding request signals. More specifically, while the image display apparatus 100 may receive request signals from the mobile terminal apparatus 110 provided at a plurality of channels, the image display apparatus 100 can only confirm request signals received at currently operating channel. For the above, the image display apparatus 100 may pass only the signals received at currently operating channel, while discarding request signals received at another channel than currently operating channel. Herein, the image display apparatus 100 may perform the filtering function which applies filters in order to pass only the signals received at currently operating channel.

When request signals are received on a same channel as a currently operating channel, the image display apparatus 100 processes image signals by modifying a nearfield communication module related or associated with AP 120, such as Wi-Fi communication into Wi-Fi direct module. Even if module may not be physically distinguished, the image display apparatus 100 may perform different communication algorithms. Thereby, the image display apparatus 100 may perform the services requested by a user of the mobile terminal apparatus 110, e.g., the screen mirroring operation. For example, when content within the mobile terminal apparatus 110 is reproduced, the reproduced content is displayed on a screen. Further, in view of the above descriptions, the image display apparatus 100 may include a switching unit to modify the modules.

Meanwhile, although FIG. 1 illustrates that the mobile terminal apparatus 110 connects with the image display apparatus 100 according to P2P, i.e., direct connecting, the image display apparatus 100 may interlock with an image receiving apparatus, such as set-top box (STB). In this case, the mobile terminal apparatus 110 can be directly connected with the image receiving apparatus. Thus, the image display apparatus 100 may perform only the mirroring function, or only the function displaying specific content reproduced on the screen. According to an embodiment, devices directly connected with the mobile terminal apparatus 110 may not be limited to the image display apparatus 100.

The mobile terminal apparatus 110 includes mobile phones such as a smart phone to perform wired and wireless communications, notebooks, tablet PCs, and PDA (Personal Digital Assistants). In this embodiment, the mobile terminal apparatus 110 may be named as source device because it provides image signals to the image display apparatus 100. Herein, image signals include video and audio signals. The mobile terminal apparatus 110 may receive multimedia content services, such as video or image, because multimedia services can be used in addition to basic communication services, such as voice and data communications. Further, the mobile terminal apparatus 110 may reproduce internal multimedia content or reproduce content by requesting the reproduction by the image display apparatus 100. For the above, the mobile terminal apparatus 110 may provide services by connecting a nearby small station, i.e., AP 120 through nearfield wireless communication (WLAN). According to an embodiment, Wi-Fi communication can be suggested or used as the nearfield wireless communication.

Further, the mobile terminal apparatus 110 may perform P2P communication in order to perform the screen mirroring operation with the image display apparatus 100. The mobile terminal apparatus 110 may perform processes, such as searching devices and negotiating channels, in order to perform P2P communication with the image display apparatus 100. For the above, the mobile terminal apparatus 110 may transmit request signals to the image display apparatus 100 by using a plurality of channels because it cannot recognize on which channel the image display apparatus 100 is currently operating. Herein, request signals may include address information regarding the mobile terminal apparatus 110. For example, when the mobile terminal apparatus 110 transmits request signals to a currently operating channel of the image display apparatus 100, the mobile terminal apparatus 110 may receive corresponding responding or response signals from the image display apparatus 100. As a result, the mobile terminal apparatus 110 may perform P2P communication with the image display apparatus 100 through the corresponding channel. Herein, responding signals may be different request signals of the image display apparatus 100 which request communication with the mobile terminal apparatus 110 based on the address information within the request signals received at the currently operating channel.

Regarding Wi-Fi P2P, basic functions of searching devices, which are performed during generating Wi-Fi P2P groups, may be performed by interchanging request signals and responding signals of IEEE 802.11 MAC protocols. Request signals may include information regarding P2P IE, WSC IE and Supp Reg IE, and responding signals may include information regarding P2P IE, WSE IE, RSN IE and Supp Reg IE. Wi-Fi P2P function is suggested by considering compatibility with the related normal Wi-Fi function, i.e., legacy Wi-Fi function. Thus, while using the legacy Wi-Fi function, a user may try Wi-Fi P2P connecting. For example, while the mobile terminal apparatus 110 is operating in the legacy Wi-Fi station mode, which can provide the communication function by connecting specific AP 120, a user may request the implementing of the Wi-Fi P2P function for the purpose of sharing files.

AP 120 includes small stations, such as femto or pico stations, which are built within buildings. Herein, femto and pico stations are divided according to how many devices performing as image display apparatus 100 and mobile terminal apparatus 110 can be connected at a maximum in classifying small stations. AP 120 includes a nearfield communication module to perform the nearfield communication, such as Zigbee and Wi-Fi, with the image display apparatus 100 and the mobile terminal apparatus 110. AP 120 may use TCP/IP or RTSP (Real-Time Streaming Protocol) for the wireless communication.

The nearfield communication according to an embodiment may be performed according to various standards regarding RF (Radio Frequency) and the ultra wideband communication (UWB) such as Bluetooth, Zigbee, Infrared (IrDA), UHF (Ultra High Frequency) and VHF (Very High Frequency) as well as Wi-Fi. Thereby, AP 120 may extract positions of data packets, designate the best communication path regarding the extracted positions, and deliver the data packets that follow to the designated communication path to the next device, e.g., the image display apparatus 100 and the mobile terminal apparatus 110. AP 120 may share a plurality of circuits in a general network environment; for example, a router, a repeater and a mediator may be included.

The communication network 130 includes all of the wired and the wireless communication networks. Herein, the wired network includes the internet network, such as cable network or public telephone network (PSTN), and the wireless network includes CDMA, WCDMA, GSM, EPC (Evolved Packet Core), LTE (Long Term Evolution), and Wibro network. Thus, when the communication network 130 is the wired communication network, AP 120 may connect an exchange station of a telephone station. However, when the communication network 130 is the wireless communication network, AP 120 may process data by connecting SGSN or GGSN (Gateway GPRS Support Node) managed by a communication service company, or by connecting various mediators such as BTS (Base Station Transmission), NodeB, and e-NodeB. The embodiment separately illustrates an AP 120 separate from the communication network 130 for convenient explanation. When being implemented, AP 120 may be preferably included in the communication network 130.

The service providing apparatus 140 includes a broadcasting server managed by a broadcasting station. Further, in addition to the server managed by a broadcasting station, the service providing apparatus 140 may include servers of image content providers that provide various image content. The service providing apparatus 140 provides the content requested by a user in the image display apparatus and the mobile terminal apparatus 110.

As a result of the above, when the image display apparatus 100 receives request signals transmitted from the mobile terminal apparatus 110, a time cost for searching for P2P terminals in the related P2P connecting can be greatly reduced by selectively performing P2P communication only with the received request signals at the currently operating channel. In other words, according to an embodiment, the performance deterioration in the related Wi-Fi functions is solved by removing the sharing physical resources in order to perform the listening to channels before receiving Wi-Fi P2P request signals. When the P2P listening state is operated in the background through the related Wi-Fi operating channels, every operation of Wi-Fi P2P may not be requested before corresponding P2P device, e.g., the mobile terminal apparatus 110, is recognized. When request signals are obtained only from a currently listening or listened to channel, in other words, when request signals are received at the currently operating channel of the image display apparatus 100, P2P device, e.g., the mobile terminal apparatus 110 may start the time-sharing regarding physical resources. Therefore, the related inefficient performance deterioration in Wi-Fi can be solved.

Figure 3:
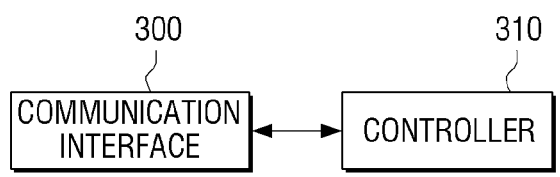
FIG. 3 is a block diagram of the user terminal apparatus according to a first embodiment.

FIG. 3 is a block diagram of the user terminal apparatus according to a first embodiment.

Referring to FIG. 3 with FIG. 1 for convenient explanation, the user terminal apparatuses 100/110 according to an embodiment may include a communication interface 300 and a controller 310. In addition, a display and a user interface may be further included.

The communication interface 300 performs communication with a first external device, e.g., AP 120. Thereby, the communication interface 300 may receive image signals transmitted from AP 120 according to the unicast and the multicast methods. The communication interface 300 may receive request signals for P2P communication provided in a broadcasting format from a second external device, e.g., the mobile terminal apparatus 110 while receiving image signals. Herein, request signals may be provided at a plurality of channels. Thus, the communication interface 300 may ignore or discard request signals received at another channel than the currently operating channel. For the above, the communication interface 300 may perform the filtering operation by applying filters to bypass signals of specific bandwidth.

The communication interface 300 performs P2P communication with the mobile terminal apparatus 110 under the control of the controller 310 by determining or recognizing the request signals received at the currently operating channel with AP 120. In other words, the communication interface 300 performs Wi-Fi P2P communication with the mobile terminal apparatus 110 by modifying communication methods while performing Wi-Fi communication with AP 120. For the above, the communication interface 300 may implement different communication algorithms for each.

The controller 310 may be provided with the signals transmitted on the currently operating channel through the communication interface 300. When the signals are received, the controller 310 may first determine whether the received signals are broadcasting signals or not. As a determination result, when the signals are broadcasting signals, the controller 310 may additionally determine whether the signals are request signals transmitted for P2P communication from the mobile terminal apparatus 110. When the signals are determined to be request signals, the controller 310 controls the communication interface 300 to modify communication methods. During the above process, the controller 310 may control the communication interface 300 to communicate based on address information of the mobile terminal apparatus 110 included in the received request signals.

Although not specifically illustrated in the drawings, the controller 310 may include an image processor. Herein, when the image processor is implemented to receive broadcasting signals from the service providing apparatus 140, the image processor may include a part or all of a tuner, a demodulator, a demux, an audio processor and a video processor. Further, a voice outputter may be included. The tuner is provided to select broadcasting programs chosen by a user, a demodulator is provided to restore the broadcasting signals which are modulated and received, and the demux is provided to separate audio, video and additional information from the broadcasting signals. The audio processor and the video processor may include a decoder and a processor. The decoder may decode encoded data, and the processor may manage the scaling and the controlling of the data. Further, when the image display apparatus 100 performs the screen mirroring function of the mobile terminal apparatus 110, the image processor may process the video signals provided from corresponding mobile terminal apparatus 110, i.e., screen data and content chosen by a user, and output them to the display. In this case, when the mobile terminal apparatus 110 provides HDMI content, the image processor may output by performing only the function to scale an uncompressed format of corresponding content.

Although not illustrated in the drawings, the display may display the image signals received through AP 120 on the screen, and perform the screen mirroring function of the mobile terminal apparatus 110 when performing P2P communication with the mobile terminal apparatus 110. When the display is implemented to be a touch screen, user commands may be received through GUI (Graphic User Interface) displayed on the screen. Meanwhile, the user interface may include various buttons; for example, when the display is not a touch screen, user commands may be inputted through the user interface.

Figure 4:
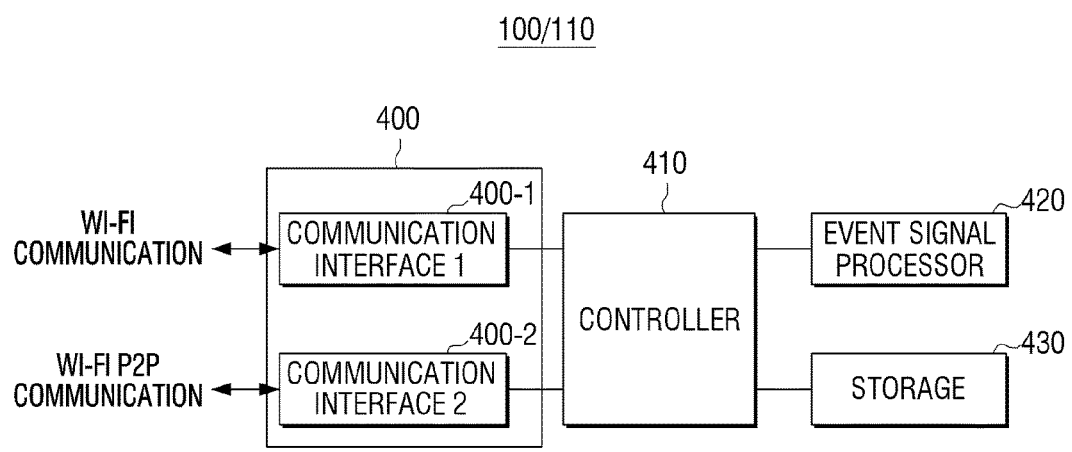
FIG. 4 is a block diagram of a user terminal apparatus according to a second embodiment.

FIG. 4 is a block diagram of the user terminal apparatus according to a second embodiment.

Referring to FIG. 4 with FIG. 1 for convenient explanation, the user terminal apparatuses 100/110 according to an embodiment may include a part or all of the communication interface 400, the controller 410, an event signal processor 420, and a storage 430. Further, the display and the user interface may be included.

Herein, including a part or all indicates that a unit, such as storage 430, may be excluded, or another unit, such as event signal processor 420, may be united/included and constituted or combined with the controller 410. For the understanding of the embodiment, the following will explain including all.

The communication interface 400 includes a communication interface 1 400_1 and a communication interface 2 400_2. The communication interface 400 may selectively perform communication through the communication interface 2 400_2 under the control the controller 410 while performing communication with a first external device, such as a nearby AP 120 through the communication interface 1 400_1. Herein, performing selectively indicates that the communication interface 2 400_2 is temporarily driven only when specific conditions are met while the communication interface 1 400_1 is mainly driven.

In other words, the communication interface 400 may process image signals transmitted from AP 120 through the communication interface 1 400_1, and receive broadcasting signals transmitted from a second external device, such as mobile terminal apparatus 110, in order to perform P2P communication. Herein, broadcasting signals may include request signals to request P2P communication. For example, when corresponding broadcasting signals are request signals for P2P communication regarding the broadcasting signals of a specific channel received to the communication interface 1 400_1, the communication interface 400 performs communication through the communication interface 2 400_2. In this process, the communication interface 1 400_1 may perform Wi-Fi communication, and the communication interface 2 400_2 may perform Wi-Fi P2P communication.

The controller 410 controls general operation of the user terminal apparatuses 100/110. In other words, when broadcasting signals of a specific channel are received by the communication interface 1 400_1, the controller 410 may deliver corresponding signals to the event signal processor 420 in order to determine whether corresponding broadcasting signals are request signals to perform P2P communication. Further, the controller 410 may deliver event signals provided from the event signal processor 420 to the communication interface 2 400_2. Herein, event signals are signals used to inform that the request signals have arrived when corresponding broadcasting signals are request signals for P2P communication as a determined result. In this process, the event signals may provide address information included in the request signals to the communication interface 2 400_2. Thus, the communication interface 2 400_2 may perform communication with the mobile terminal apparatus 110 based on the address information. Further, the controller 410 may temporarily store various pieces of information or data in the storage 430, and use the data when necessary.

Further, the controller 410 may include the image processor likewise in the controller 310 of FIG. 3. For example, the user terminal apparatuses 100/110 may reproduce image signals provided from the service providing apparatus 140 of FIG. 1, e.g., multimedia content. Thus, the user terminal apparatuses 100/110 may perform basic functions, such as separating image signals into video and audio signals, decoding the separated video signals, and scaling the decoded video signals. Detailed functions of the controller 410 related to the image processing can be referred to the controller 310 of FIG. 3 because they are not greatly different from each other.

The event signal processor 420 determines whether signals provided from the controller 410 are broadcasting signals or not. When the signals are broadcasting signals as a determined result, the event signal processor 420 may determine whether corresponding broadcasting signals are request signals to perform P2P communication. When the broadcasting signals are determined to be request signals, the event signal processor 420 may generate event signals informing that that request signals have arrived from the mobile terminal apparatus 110, and provide the event signals to the controller 410. In this process, the event signals may include address information included in the request signals. For example, the event signal processor 420 may determine whether the received signals are synchronized or confirm header information of data packet in order to determine the types of the received signals. Further, in order to determine whether signals are request signals or not, the event signal processor 420 may confirm a payload. Other various embodiments may be implemented; however, the embodiments are not limited to the above descriptions.

The storage 430 may process various pieces of information processed within the user terminal apparatuses 100/110. Further, the stored information or data may be output under the control of the controller 410. For example, the controller 410 may store additional information processed in the image processor in the storage 430. When there is a user request while specific video is displayed on the display, or when it is requested to automatically combine and output corresponding additional information, the controller 410 may request the additional information stored in the storage 430, and the storage 430 may output corresponding information under the control of the controller 410.

Figure 5:
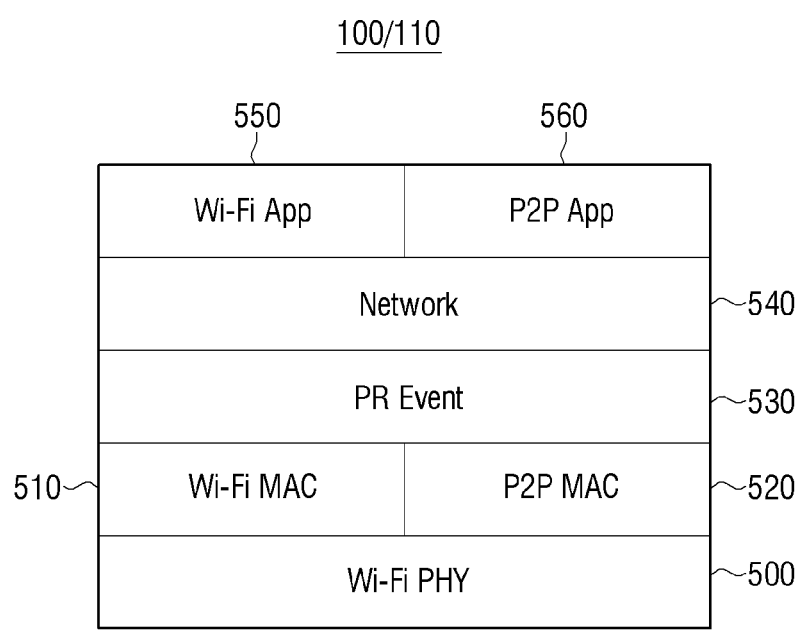
FIG. 5 illustrates an example of logical strata regarding the user terminal apparatus of FIG. 1.

FIG. 5 illustrates an example of logical strata or structure regarding the user terminal apparatus.

Referring to FIG. 5 with FIG. 1, the user terminal apparatuses 100/110 according to an embodiment may include a wireless LAN module to perform wireless LAN communication with AP 120 such as Wi-Fi and Wi-Fi direct module to perform Wi-Fi direct communication. The wireless LAN module and the Wi-Fi direct module may share physical channels.

FIG. 5 illustrates the physical structure to be a logical strata or structure and the user terminal apparatuses 100/110 of FIG. 1 may be constituted with Wi-Fi PHY stratum 500, Wi-Fi MAC stratum 510, P2P MAC stratum 520, PR (Probe Request) event stratum 530, Network stratum 540, Wi-Fi App stratum 550, and P2P App stratum 560. Wi-Fi PHY stratum 500 performs the transmitting and the receiving data by using wireless channels. Wi-Fi MAC stratum 510 performs MAC end connecting for normal functions of wireless LAN, i.e., Wi-Fi by connecting AP 120. P2P MAC stratum 520 performs the finding P2P terminals, the interchanging relevant information, and the establishing GO (Group Owner). The upper Network stratum 540 performs the routing with IP addresses, and the most upper Wi-Fi App stratum 550 and P2P App stratum 560 implement applications.

The user terminal apparatuses 100/110 according to an embodiment process the function in order to receive simple Wi-Fi P2P request signals at Wi-Fi MAC stratum 510. Thus, the performance deterioration of normal Wi-Fi that may occur by listening to P2P channels can be prevented. It may be established to support all of normal Wi-Fi and Wi-Fi P2P when the operating system (OS) boots. In this process, when normal Wi-Fi is used, establishing the listening mode to search Wi-Fi P2P devices, e.g., to search the mobile terminal apparatus 110 is simultaneously set by a user. When the above function is off, the operating system operates according to the related method. When the above function is on, the operating system may receive request signals from a corresponding P2P device through a channel connected with AP 120 even when it operates according to normal Wi-Fi. When correct Wi-Fi P2P request signals are received, the normal Wi-Fi MAC stratum 510 does not transmit the request signals to upper layers, and transmits the signals in event format to P2P MAC stratum 520, so that P2P MAC stratum 520 starts operating. The structure in which Wi-Fi MAC stratum 510 transmits PR event signals is illustrated in FIG. 5. When Wi-Fi MAC stratum 510 processes P2P request signals, Wi-Fi MAC stratum 510 transmitting and receiving data through channel can continuously share wireless resources. Thus, the performance deteriorating that may occur in Wi-Fi can be prevented. Processes after Wi-Fi response are performed by P2P MAC stratum 520. Further, unless there is another request, Wi-Fi MAC stratum 510 keeps extracting request signals. When there is another request, corresponding functions may close. Two MACs may independently operate uniformly according to the related method when there is corresponding P2P device.

In summary, when Wi-Fi MAC stratum 510 like the wireless LAN module connects AP 120 through Wi-Fi PHY stratum 500, and when broadcasting signals received through specific channel are determined to be request signals to perform P2P communication, event signals regarding the request signals may be generated and informed or sent to P2P MAC stratum 520. Through the above process, P2P MAC stratum 520 like Wi-Fi direct module performs P2P communication with the mobile terminal apparatus 110 through Wi-Fi PHY stratum 500. During the process, the image display apparatus 100 implements an application on Wi-Fi APP stratum 550 in order to perform communication with AP 120, and an application on P2P App stratum 560 in order to perform communication with the mobile terminal apparatus 110.

Figure 6:
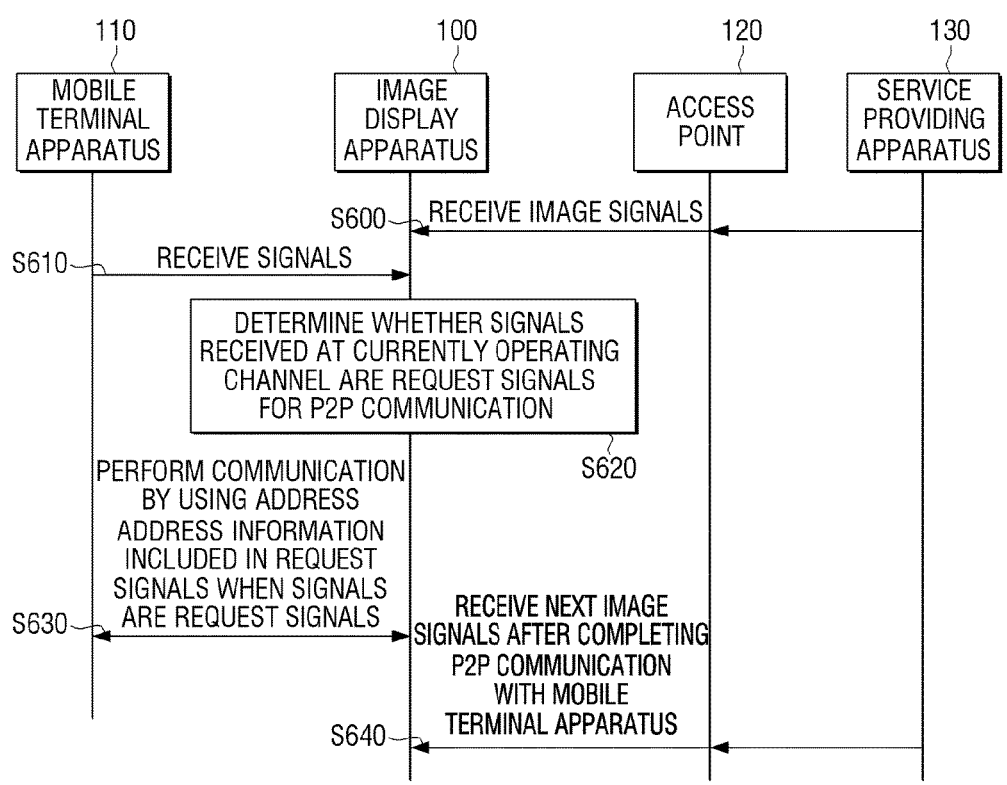
FIG. 6 illustrates signal-processing according to an embodiment.

FIG. 6 illustrates signal-processing according to an embodiment.

Referring to FIG. 6, the image display apparatus 100 according to an embodiment receives image signals provided from the service providing apparatus 140 by accessing surrounded AP 120 at S600. During the above process, the image display apparatus 100 may perform Wi-Fi communication with AP 120. Image signals may be provided in the unicast and the multicast formats.

At S610, the image display apparatus 100 receives P2P signals in the broadcasting format when the mobile terminal apparatus 110 requests P2P communication while performing communication with AP 120.

At S620, the image display apparatus 100 determines whether the received P2P signals on currently operating channel are request signals or not. During the above process, the image display apparatus 100 first determines whether the received P2P signals are broadcasting signals or not, and determines whether the signals are request signals transmitted to perform P2P communication when they are broadcasting signals as a determined result.

When the signals are determined to be request signals, the image display apparatus 100 performs communication with the mobile terminal apparatus 110 based on address information of the mobile terminal apparatus 110 included in the request signals at S630. For example, the image display apparatus 100 may perform Wi-Fi direct communication with the mobile terminal apparatus 110.

When Wi-Fi direct communication closes, the image display apparatus 100 may continue the communication with AP 120 at S640.

In summary, when signals are received at currently operating channel from the mobile terminal apparatus 110 while performing communication with AP 120, the image display apparatus 100 may determine whether the received signals are broadcasting signals and request signals. When the signals are request signals as a determined result, the image display apparatus 100 may selectively perform P2P communication with the mobile terminal apparatus 100.

Figure 7:
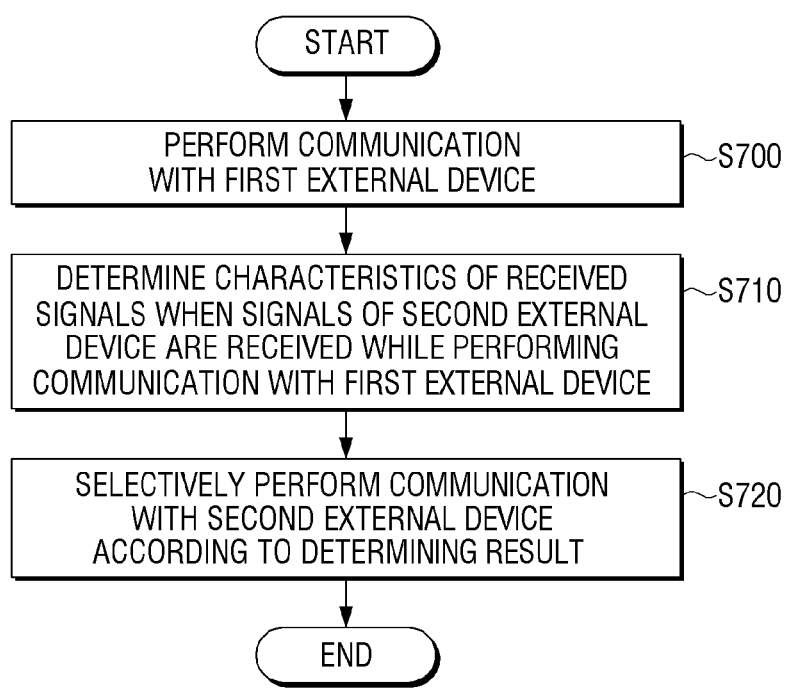
FIG. 7 is a flowchart provided to explain a driving method of a user terminal apparatus according to a first embodiment.

FIG. 7 is a flowchart provided to explain a driving method of the user terminal apparatus according to a first embodiment.

Referring to FIG. 7 with FIG. 1 for convenient explanation, the image display apparatus 100 as user terminal apparatus performs communication with a first external device, such as nearby AP 120 at S700. Through the above process, image signals according to multimedia services may be received.

When signals are received from a second external device, such as mobile terminal apparatus 110, while performing communication with AP 120, the image display apparatus 100 determines whether the received signals are request signals to perform P2P communication at S710. Herein, the received signals may be provided at a plurality of channels; the signals used in the determining process may be signals received on the currently operating channel which performs communication with a first external device. When signals are received through the above process, the image display apparatus 100 may first determine whether the received signals are broadcasting signals, and additionally determine whether the signals are request signals when they are determined to be broadcasting signals. Various methods may be used in the determining of the signals, which is not specifically limited to the above.

When the signals are request signals as a determined result, the image display apparatus 100 selectively performs communication with the mobile terminal apparatus 110 based on address information included and provided in the request signals at S720. Herein, performing communication selectively indicates that P2P communication is performed only when there is a request for P2P communication received at or on the currently operating channel from the mobile terminal apparatus 110 while mainly performing communication with AP 120.

The above describes the user display apparatus 100 as one example of the user terminal apparatuses 100/110. However, when the mobile terminal apparatus 110 is described as one example of the user terminal apparatuses 100/110, the mobile terminal apparatus 110 may determine whether signals provided to the image display apparatus 100 are request signals, and perform P2P communication. Thus, the embodiments are is not specifically limited to the above.

Figure 8:
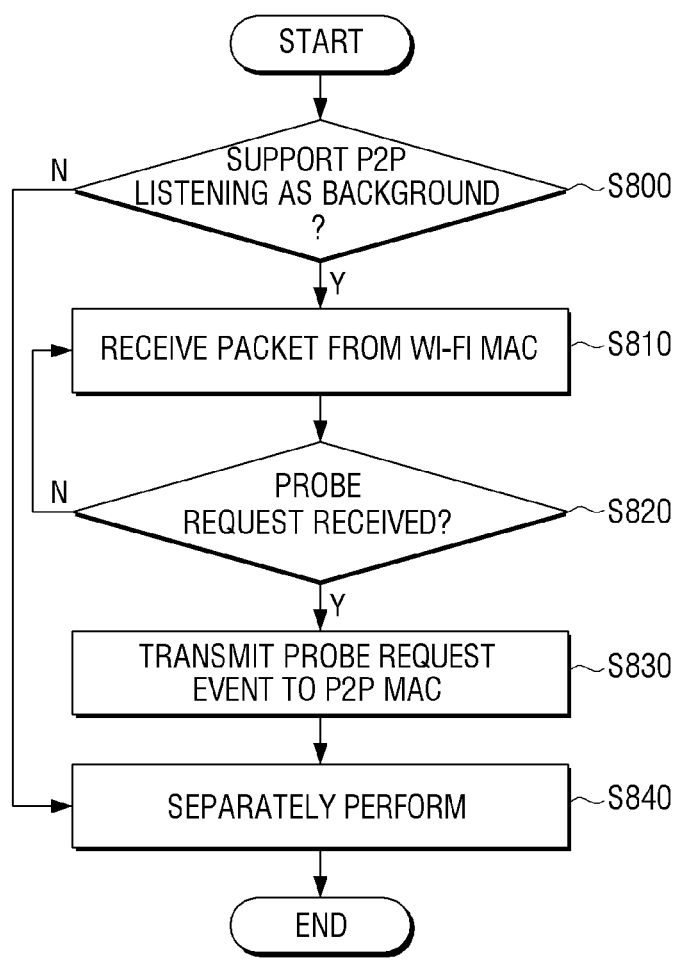
FIG. 8 is a flowchart provided to explain the driving method of a user terminal apparatus according to a second embodiment.

FIG. 8 is a flowchart provided to explain the driving method of the user terminal apparatus according to a second embodiment.

Referring to FIG. 8 with FIG. 1 for convenient explanation, the image display apparatus 100 as one of the user terminal apparatuses 100/110 determines whether to support P2P in the background at S800. For example, the image display apparatus 100 may determine whether Wi-Fi communication and Wi-Fi P2P communication are established to be performed simultaneously.

When P2P cannot be supported as a determined result, the image display apparatus 100 continues to perform Wi-Fi communication at S840. However, when P2P can be supported, the image display apparatus 100 may receive a packet to perform P2P communication through Wi-Fi MAC, i.e., Wi-Fi communication module at S810. Herein, the received packet may include image signals in the unicast and the multicast formats according to Wi-Fi communication and request signals in the broadcasting format for P2P communication.

At S820, the image display apparatus 100 may determine whether signals of the received packet are request signals. During the above process, the image display apparatus 100 may first determine whether signals of the received packet are request signals.

When the signals are not request signals for P2P communication as a determining result, the image display apparatus 100 may determine whether signals of the next received packet are request signals at S810. However, when the signals are request signals, the image display apparatus 100 may inform or indicate that P2P request signals are received from the mobile terminal apparatus 110 in event format to P2P MAC, i.e., Wi-Fi direct module at S830.

At S840, the image display apparatus 100 may perform P2P communication with the mobile terminal apparatus 110 through Wi-Fi direct module.

Meanwhile, although all the units constituting the above embodiments are described to be combined into one device or combined and performed, they are not limited to the above embodiments. Thus, within the purpose scope of the embodiments, all the units may be selectively combined into more than one device and performed. Further, all the units may be implemented to be independent hardware; a part or whole of each unit may be selectively combined and implemented to be computer programs including program modules which perform functions of the combined parts or the combined whole parts in a plurality of hardware. Codes and code segments constituting the computer programs can be easily inferred by those skilled in the art. The embodiments may be implemented by storing the computer programs in non-transitory computer readable recording medium to be read and implemented by a computer.

Non-transitory computer readable recording or storage medium indicate medium which store data semi-permanently and can be read by devices, not medium storing data temporarily, such as a register, a cache, or memory. Specifically, the above various applications or programs may be stored and provided in non-transitory computer readable recording medium such as CD, DVD, hard disk, Blu-ray disk, USB, memory card, or ROM.

Further, the foregoing exemplary embodiments and advantages are merely exemplary and are not to be construed as limiting the exemplary embodiments. The present teaching can be readily applied to other types of apparatuses. Also, the description of the exemplary embodiments is intended to be illustrative, and not to limit the scope of the claims.

What is claimed is:

1. A user terminal apparatus configured to perform communication with a first external device and a second external device, comprising:
   a first communication interface to perform a first communication function;
   a second communication interface to perform a second communication function; and
   a controller to,
      control the first communication interface to establish a communication with a first external device,
      control the first communication interface to operate in a listen state to receive a request signal for the second communication interface on a currently operating channel in which the first communication interface is performing communicating with the first external device,
      control the second communication interface to perform communication with a second external device, in response to the request signal for communication with the second external device being received from the second external device via the currently operating channel of the first communication interface while the first communication interface is performing communication with the first external device,
      wherein, the controller provides, in response to the received request signal, an event signal that includes address information of the second external device, to the second communication interface to cause the second communication interface perform the communication with the second external device.

2. The user terminal apparatus of claim 1, wherein the first communication interface performs wireless LAN communication, and the second communication interface performs direct peer to peer (P2P) communication.

3. The user terminal apparatus of claim 1, wherein the controller,
   generates the event signal including the address information of the second external device included in the received request signal.

4. The user terminal apparatus of claim 2, further comprising:
   an event signal processor to,
      determine a characteristic of the received request signal according to whether the received request signal is a request signal (Probe Request) for the direct P2P communication, and
      generate the event signal including the address information of the second external device included in the received request signal, in response to the received request signal being the request signal for the direct P2P communication,
      wherein the controller provides the event signal to the second communication interface to cause the second communication interface to perform communication with the second external device based on the address information of the event signal.

5. The user terminal apparatus of claim 2, wherein the controller implements a switch to select communication paths of the first communication interface and the second communication interface.

6. The user terminal apparatus of claim 1, wherein the first communication interface passes the received request signal to the controller when the request signal is received on the currently operating channel, and
 discards the received request signal when the request signal is of the second external device received on a different channel from the currently operating channel.

7. The user terminal apparatus of claim 1, wherein the controller,
 determines a type of the received request signal to determine a characteristic of the received request signal, and
 in response to the received request signal determined to be a broadcasting signal, additionally determines whether the broadcasting signal is a request signal for direct P2P communication.

8. A driving method of a user terminal apparatus, the method comprising:
 controlling a first communication interface to establish a communication with the first external device;
 controlling the first communication interface to operate in a listen state to receive a request signal for a second communication interface on a currently operating channel in which the first communication interface is performing communication with the first external device
 determining whether the request signal for communication with a second external device is received from the second external device via the currently operating channel of the first communication interface while the first communication interface is performing communication with the first external device; and
 in case of a determination that the request signal is received, providing an event signal that includes address information of the second external device, to the second communication interface to cause the second communication interface perform a communication with the second external device.

9. The driving method of claim 8, wherein the first communication interface performs wireless LAN communication, and the second communication interface performs direct peer to peer (P2P) communication.

10. The driving method of claim 9, wherein the wireless LAN communication and the direct P2P communication are Wi-Fi communications.

11. The driving method of claim 9, further comprising:
 generating, by the controller, the event signal including the address information of the second external device included in the received request signal, in response to the received request signal being a request signal for the direct P2P communication.

12. The driving method of claim 8, further comprising:
 filtering the received request signal of the currently operating channel on which the communication by the first communication interface with the first external device is performed.

13. The driving method of claim 8, further comprising:
 discarding a signal from the second external device received on a channel other than the currently operating channel.

14. The driving method of claim 8, further comprising:
 determining a type of the received request signal; and
 in response to the received request signal determined to be a broadcasting signal, determining whether the broadcasting signal is a request signal for direct P2P communication.

15. A computer readable non-transitory recording medium to implement a driving method of a user terminal apparatus, the driving method of the user terminal apparatus comprises:
 controlling a first communication interface to establish a communication with a first external device;
 controlling the first communication interface to operate in a listen state to receive a request signal for a second communication interface on a currently operating channel in which the first communication interface is performing communication with the first external device;
 determining whether the request signal for communication with a second external device is received from the second external device via the currently operating channel of the first communication interface while the first communication interface is performing communication with the first external device; and
 in case of a determination that the request signal is received, providing an event signal that includes address information of the second external device, to the second communication interface to cause the second communication interface perform a communication with the second external device.

16. The computer readable recording medium of claim 15, further comprising:
 determining a type of the received request signal; and
 in response to the received request signal determined to be a broadcasting signal, determining whether the broadcasting signal is a request signal for direct P2P communication.

17. The computer readable recording medium of claim 15, further comprising:
 filtering the received request signal of the currently operating channel on which communication by the first communication interface with the first external device is performed; and
 discarding a signal from the second external device received on a channel other than the currently operating channel.

18. The computer readable recording medium of claim 15, wherein communication between the user terminal apparatus and the first external device is Wi-Fi communication, and communication between the user terminal apparatus and the second external device is Wi-Fi direct communication.

* * * * *